(12) United States Patent
Smith et al.

(10) Patent No.: US 6,901,056 B1
(45) Date of Patent: May 31, 2005

(54) SYSTEM AND METHOD FOR TIME MULTIPLEXING OF MULTI-DOMAIN TRANSACTIONS

(75) Inventors: Brian L. Smith, Sunnyvale, CA (US); Ashok Singal, Redwood City, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 09/569,988

(22) Filed: May 11, 2000

(51) Int. Cl.$^7$ .......................... H04L 12/28; G06F 15/16
(52) U.S. Cl. ................ 370/254; 370/401; 370/468; 709/203; 709/223; 718/101; 718/107
(58) Field of Search .................. 370/254, 280, 370/294, 401, 412, 428, 429, 442, 458, 468, 477, 498, 503, 535; 705/1, 7, 8; 709/201, 202, 203, 220, 223, 224, 225, 226, 227, 229; 718/100, 101, 102, 104, 107

(56) References Cited

U.S. PATENT DOCUMENTS

| | | | | |
|---|---|---|---|---|
| 3,562,432 A | * | 2/1971 | Gabbard | 370/324 |
| 5,006,855 A | * | 4/1991 | Braff | 342/357.17 |
| 5,805,786 A | | 9/1998 | Badovinatz et al. | 714/4 |
| 6,148,410 A | | 11/2000 | Baskey et al. | 714/4 |
| 6,614,811 B1 | * | 9/2003 | Alaimo et al. | 370/498 |
| 6,836,483 B1 | * | 12/2004 | Lee | 370/395.31 |
| 6,839,680 B1 | * | 1/2005 | Liu et al. | 705/10 |
| 2002/0023159 A1 | * | 2/2002 | Vange et al. | 709/228 |
| 2002/0029287 A1 | * | 3/2002 | Yemini et al. | 709/238 |
| 2002/0031131 A1 | * | 3/2002 | Yemini et al. | 370/401 |

OTHER PUBLICATIONS

Tanenbaum, Andrew S., "Computer Networks", 1996, Prentice Hall, Third Edition, pp. 121–124 and 330–333.*
International search report application No. PCT/US01/14667 mailed Dec., 11, 2002.
"Statistical Multiplexer Frequently Asked Questions", *Eloquence Limited*, Online! 1999, http:/web.archive.org/web/200000306025423/http://www.eloquence.co.uk/faqs/faqsm.html retrieved Nov. 8, 2002.
"Carrier Sense System with Continuous Bit Synchronism", *IBM Technical Disclosure Bulletin*, IBM Corp., New York, NY, vol. 30, No. 8, Jan. 1, 1988, pp. 198–201.
"Re: Doing Different Things While Downloading Possible?", Henry, Newsgroup Message, 'Online!, Aug. 10, 1996.
"Multicast Congestion Control for Active Network Services", Azcorra, et al, *European Transactions on Telecommunications*, Eurel Publication, Milano, IT, vol. 10, No. 3, May 1999, pp. 309–317.

* cited by examiner

*Primary Examiner*—Alpus H. Hsu
(74) *Attorney, Agent, or Firm*—Meyertons Hood Kivlin Kowert & Goetzel, P.C.; B. Noël Kivlin

(57) ABSTRACT

A system and apparatus for time multiplexing of multi-domain transactions is provided. A computer system may include multiple domains of clients where the domains share common physical links. The bandwidth on a physical link may be divided between the domains that use that link such that a domain may only convey and receive transactions specific to that domain during the time period allocated to it on that physical link. A counter may be used to partition the bandwidth of a physical link between the domains that use that physical link.

23 Claims, 5 Drawing Sheets

SYSTEM AND METHOD FOR TIME MULTIPLEXING OF MULTI-DOMAIN TRANSACTIONS

BACKGROUND OF THE INVENTION

1. Field of the Invention

This invention relates generally to the field of computer systems and, more particularly, to communication between domains in a computer system.

2. Description of the Related Art

Modern computer systems may include many clients, such as microprocessors or device controllers, that perform many functions. These clients may share resources in the computer system and a group of clients may be connected to a resource over the same physical link. The clients or a central arbitrator may arbitrate transactions on the physical link to allow each client to communicate with a resource in turn.

Depending on the needs of a computer system, clients may be grouped together to operate as a domain. Generally speaking, a domain may comprise a group of clients that are configured to operate as if they were a single system. A client within a domain may communicate with other clients in its domain by conveying transactions to and receiving transactions from the other clients. These transactions may be conveyed on the same physical links as those from other clients that may belong to other domains.

At times, a client in a first domain may generate a failing transaction and may convey the failing transaction along a physical link that is shared with a client or clients in a second domain. Since the clients in the second domain are connected to the physical link, they may receive the failing transaction from the client in the first domain and may become corrupted. Once the clients in the second domain become corrupted, they could potentially corrupt clients in other domains such that the failing transaction propagates through the system and causes the system to crash. It would be desirable to keep a failing transaction in one domain from corrupting other domains. Accordingly, a system and apparatus for preventing a failing transaction from one domain from corrupting another domain is needed.

SUMMARY

The problems outlined above are in large part solved by the use the system and apparatus described herein. Generally speaking, a system and apparatus for time multiplexing of multi-domain transactions is provided. A computer system may include multiple domains of clients where the domains share common physical links. The bandwidth on a physical link may be divided between the domains that use that link such that a domain may only convey and receive transactions specific to that domain during the time period allocated to it on that physical link. A counter may be used to partition the bandwidth of a physical link between the domains that use that physical link.

In one embodiment, a system may include a first domain of clients and a second domain of clients coupled to a central repeating level. The central repeating level may be configured to receive and convey transactions that correspond to the first domain of clients during a first time period and receive and convey transactions that correspond to the second domain of clients during a second time period. The central repeating level may include a counter such that the first time period may correspond to a first plurality of values of the counter and the second time period may correspond to a second plurality of values of the counter. The central repeating level may be coupled to additional central repeating levels that may be coupled to additional domains.

A central repeating level may include a receive queue, a transmit queue, a counter, and a control unit. The control unit may be configured to permit transactions that correspond to a first plurality of clients to be received into the receive queue and conveyed from the transmit queue in response to a first set of values of said counter. The control unit may also be configured to permit transactions that correspond to a second plurality of clients to be received into the receive queue and conveyed from the transmit queue in response to a second set of values of said counter. The control unit may be configured to inhibit transactions that correspond to the first plurality of clients from being received into the receive queue and conveyed from the transmit queue in response to the second set of values of the counter. The control unit may also be configured to inhibit transactions that correspond to the second plurality of clients from being received into the receive queue and conveyed from the transmit queue in response to the first set of values of the counter. The control unit may also be configured to select the first set of values of the counter and the second set of values of the counter according to a programmable input.

BRIEF DESCRIPTION OF THE DRAWINGS

Other objects and advantages of the invention will become apparent upon reading the following detailed description and upon reference to the accompanying drawings in which.

Figure 1:
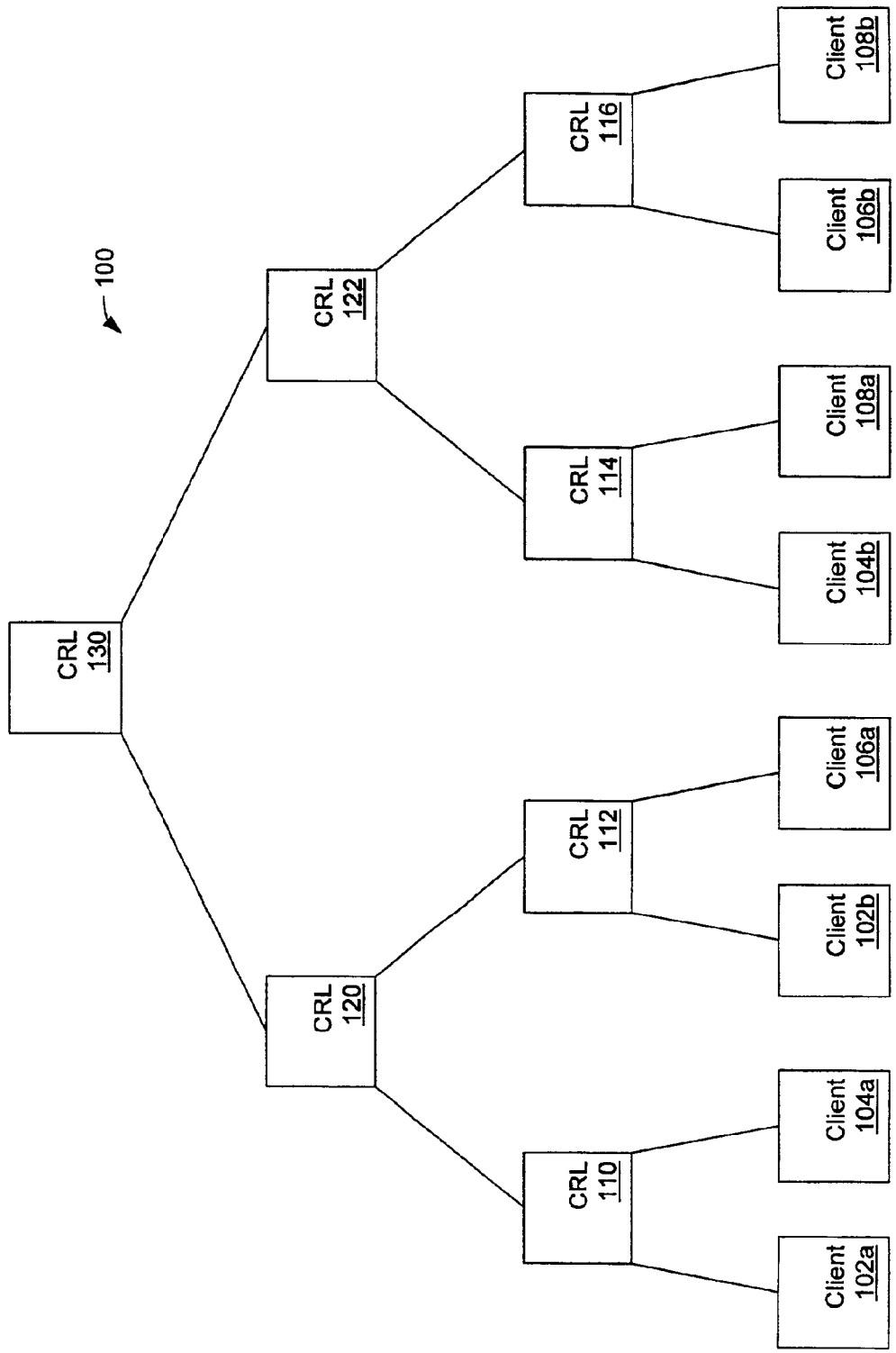
FIG. 1 is a block diagram illustrating one embodiment of a system for time multiplexing of multi-domain transactions.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims.

DETAILED DESCRIPTION OF AN EMBODIMENT

Turning now to FIG. 1, a block diagram illustrating one embodiment of a system for time multiplexing of multi-domain transactions. Other embodiments are possible and contemplated. FIG. 1 depicts central repeating level (CRL) 110, CRL 112, CRL 114, CRL 116, CRL 120, CRL 122, CRL 130. FIG. 1 also depicts client 102a, client 102b, client 104a, client 104b, client 106a, client 106b, client 108a, and client 108b. CRLs 110, 112, 114, 116, 120, 122, and 130 can be referred to individually as a 'CRL' or collectively as 'CRLs'. Similarly, clients 102a, 102b, 104a, 104b, 106a, 106b, 108a, and 108b can be referred to individually as a 'client' or collectively as 'clients'. FIG. 1 highlights one possible interconnection among the CRLs and clients. Other interconnections are possible and contemplated.

In the system of FIG. 1, the CRLs may be configured to convey transactions between the clients. The CRLs may also be configured to convey transactions between themselves. For example, client 102b can communicate with client 104b by conveying a transaction to CRL 112. CRL 112 can convey the transaction to CRL 120 which, in turn, can convey the transaction to CRL 130. CRL 130 can then convey the transaction to CRL 122, CRL 122, in turn, can convey the transaction to CRL 114 and CRL 114 can convey the transaction to client 104b. The other clients and CRLs in FIG. 1 can communicate in a similar manner. These transactions may include data transfer transactions, coherency transactions, and other operations where communication between the CRLs and/or clients occurs. The transactions may be generated by the CRLs and/or clients according to a communications protocol.

The clients of FIG. 1 can be configured to operate as one or more domains. Broadly speaking, a domain may be defined as a group of clients that are configured to operate as if they comprise a single system. Clients in a domain may share the same memory and may communicate with other domains using agents Clients from different domains may convey transtions along the same physical links. Accordingly, the bandwidth on physical links that convey transactions from multiple domains may be divided between these domains. The bandwidth may be divided into portions of time or time periods such that each time period corresponds to a different domain. Transactions that correspond to a given domain may only be conveyed on physical links that handle transactions from multiple domains during the time period for that domain.

As an example, refering to FIG. 1, the clients may be configured as domains as follows:

| DOMAIN | CLIENTS |
|---|---|
| Domain A | 102a & 102b |
| Domain B | 104a & 104b |
| Domain C | 106a & 106b |
| Domain D | 108a & 108b |

In this example, it may be seen that clients from different domains may share the same physical links between the CRLs. For example, clients 102a and 102b of domain A and clients 104a and 104b from domain B may convey tsactions across the physical link between CRL 110 and CRL 120. For client 102a to communicate with client 102b, client 102a may convey a transaction to CRL 110. The transaction may then be routed from CRL 110 to CRL 120, from CRL 120 to CRL 112, and from CRL 112 to client 102b. Similarly, client 104a may communicate with client 104b, by conveying a transaction to CRL 110. The transaction may then be routed from CRL 110 to CRL 120, from CRL 120 to CRL 130, from CRL 130 to CRL 122, from CRL 122 to CRL 114, and from CRL 114 to client 104b. Thus, clients from domain A and domain B may convey transactions across the physical link between CRL 110 and CRL 120.

Since clients from domain A and domain B may convey transactions across the physical link between CRL 110 and CRL 120, the bandwidth across this physical link may be divided between domain A and domain B. Domain A and domain B may each be granted certain time periods in which they may convey transactions between CRL 110 and CRL 120. In this manner, the chances of a failing transaction from one domain corrupting the other domain may be minimized.

For example, if CRL 110 conveys a failing transaction from client 102a (domain A) to CRL 120, CRL 110 may only convey this failing transaction during the time period allocated to domain A. CRL 110 may not convey the failing transaction from domain A during the time period allocated to domain B. Accordingly, the chances that the failing transaction from domain A from corrupting domain B may be minimized.

One will appreciate that clients from different domains may also share the physical links between CRL 120 and CRL 112, CRL 120 and CRL 130, CRL 130 and CRL 122, CRL 122 and CRL 114, and CRL 122 and CRL 116 in this example. The bandwidth across these physical links may be divided between the domains that share them in a manner similar to that discussed above. One will also appreciate that in other examples, other numbers of clients may be included in each domain, other numbers of domains may share a physical link, and the conmections between the clients and the CRLs may be made in other manners.

Figure 2:
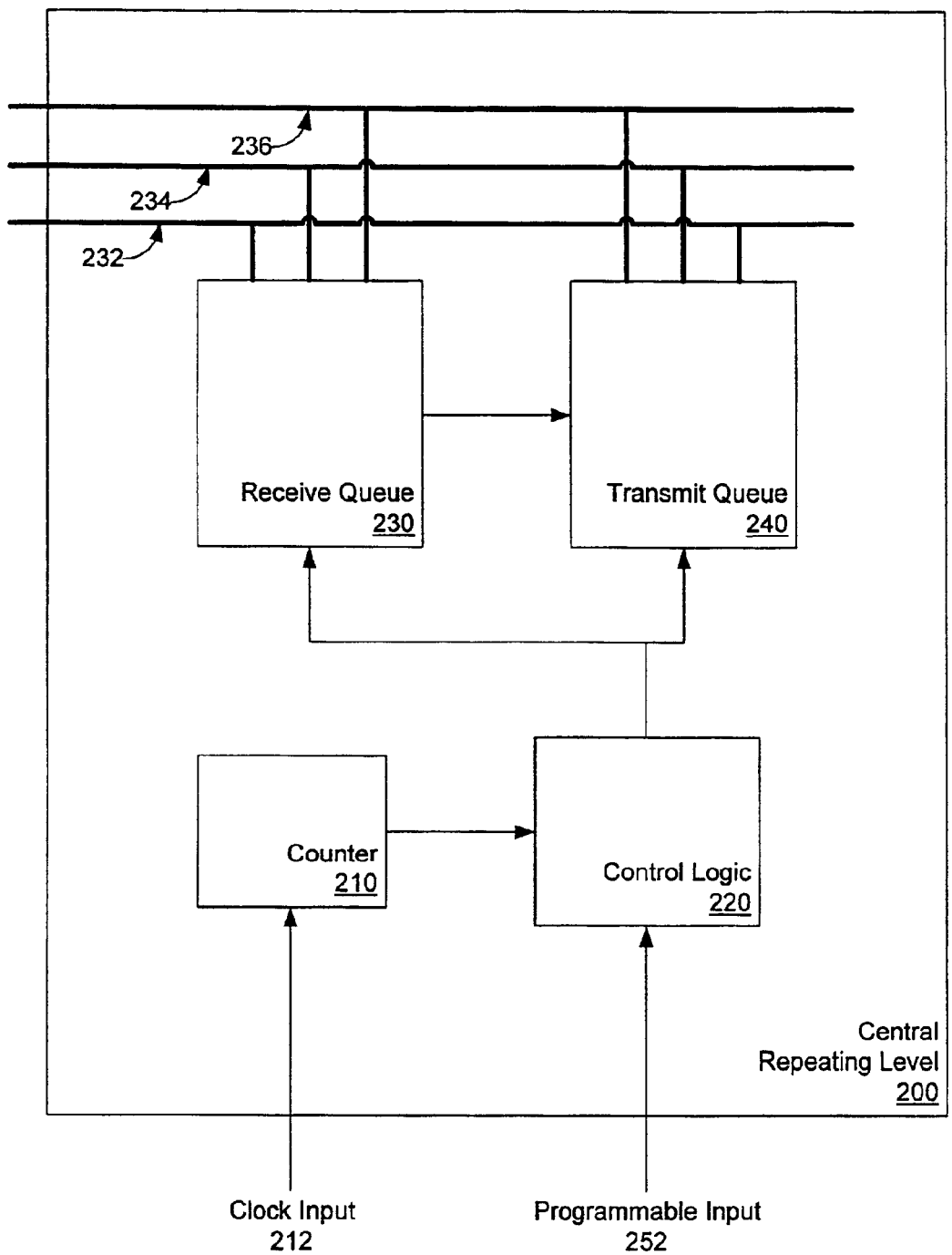
FIG. 2 is a block diagram illustrating one embodiment of a central repeating level.

Turning now to FIG. 2, a block diagram illustrating one embodiment of a central repeating level is shown. Other embodiments are possible and contemplated. CRL 200 includes receive queue 230 and transmit queue 240 coupled to physical links 232, 234, and 236. CRL 200 further includes counter 210 coupled to control logic 220, and control logic 220 coupled to receive queue 230 and transmit queue 240. Receive queue 230 is also coupled to transmit queue 240. Counter 210 may receive clock input 212 and control logic 220 may receive programmable input 252 as indicated.

CRL 200 may receive and convey transactions corresponding to multiple domains on physical links 232, 234, and 236. CRL 200 may be configured to divide the bandwidth across each physical link between the domains that share a given physical link as discussed above. Accordingly, CRL 200 may be configured to permit transactions from a given domain to be received and conveyed across a given physical link only during certain time periods. CRL 200 may be configured to prevent or inhibit transactions from other domains from being conveyed and received across the physical link during these time periods. CRL 200 may be configured to store transactions it receives in receive queue 230 and store transactions to be conveyed in transmit queue 240.

Control logic 220 may be used to divide the bandwidth across physical links 232, 234 and 236 according to the domains that share each physical link. Control logic 220 may be configured to assign a time period to each domain that shares a physical link. Control logic 220 may assign the same or different size time periods to each domain according to certain parameters. For example, control logic 220 may assign larger time periods to domains that have larger numbers of clients sharing a particular physical link and smaller time periods to domains that have smaller numbers of clients sharing that physical link. Control logic 220 may also assign time periods based on other factors such as the overall size or relative importance of a domain and may actively monitor the traffic on a given physical link to dynamically assign and re-assign time periods according to the volume of traffic from each domain. In this context, the volume of traffic for a domain may measured by the number of transactions generated by the clients of that domain over a period of time. Control logic 220 may further assign time periods based on information received from programmable input 252. Using programmable input 252, a user may cause control logic 220 to assign time periods based on one or more input variables. These input variables may specify the size of time periods or time slices.

Figure 3:
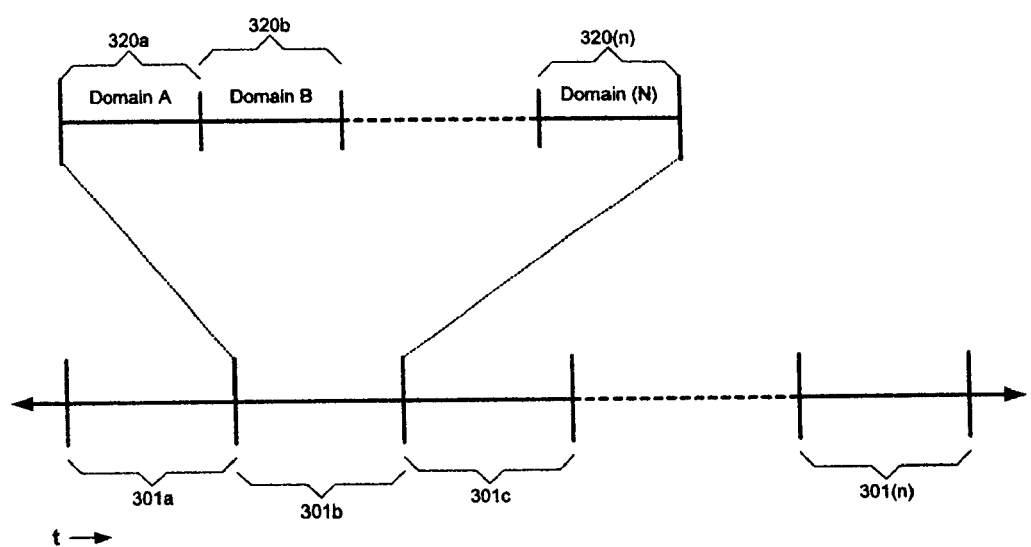
FIG. 3 is a time line illustrating a plurality of time slices.

Control logic 220 may cause time periods of time slices to be assigned to domains as illustrated in FIG. 3. FIG. 3 depicts a time line with a plurality of time slices 301a, 301b, 301c, and 301(n) where n may be any integer. As seen in the expanded view of time slice 301b, control logic 220 may assign time periods in each time slice 301a, 301b, 301c, and 301(n), wherein n may be any integer, to the domains that share a physical link. As shown, control logic 220 may assign time period 320a to domain A, 320b to domain B, and 320(n) to domain (N) where N may be the Nth domain. As noted above, each time period may be the same size or may differ in size depending on any number of factors.

Control logic 220 may also be configured to cause time periods for a particular domain to overlap between different physical links. Control logic 220 may further be configured to cause a transaction to be stored in receive queue 230 or transmit queue 240 until a time period corresponding to the domain of the transaction becomes available on a physical link. The ability to overlap time periods may be particularly useful when CRL 200 receives a transaction and needs to route the transaction to another CRL. For example, CRL 200 may receive a transaction corresponding to domain A from a first CRL or client on physical link 232 and may need to convey the transaction to a second CRL on physical link 234. This characteristic may be seen in the example shown in FIG. 4.

Figure 4:
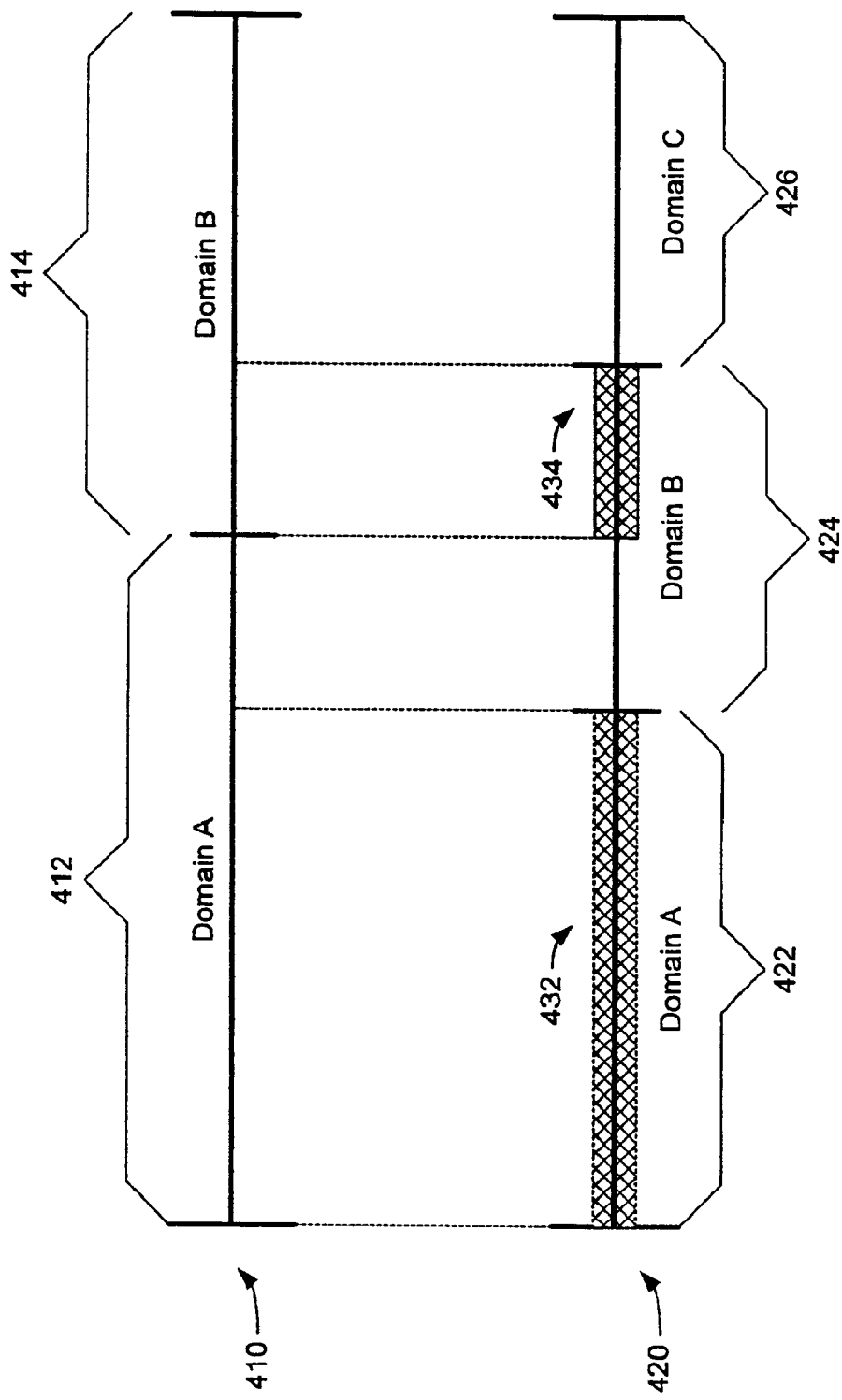
FIG. 4 is a diagram illustrating one embodiment of portions of time slices assigned to a plurality of domains.

In FIG. 4, a diagram illustrating portions of time slices that correspond to different physical links is shown. For example, time slice portion 410 may correspond to physical link 232 and time slice portion 420 to physical link 234. As shown in this example, time slice portion 410 includes time period 412 assigned to domain A and time period 414 assigned to domain B. Similarly, time slice portion 420 includes time period 422 assigned to domain A, time period 424 assigned to domain B, and time period 426 assigned to domain C. It can be seen that the shaded region 432 identifies an overlap of time for domain A between time period 412 on a first physical link and time period 422 on a second physical link. Accordingly, control unit 220 may be configured to cause a transaction corresponding to domain A to be both received and conveyed during the time period identified by the shaded region 432. It can also be seen that the shaded region 434 identifies an overlap of time for domain B between time period 414 on a first physical link and time period 424 on a second physical link. Accordingly, control unit 220 may be configured to cause a transaction corresponding to domain B to be both received and conveyed during the time period identified by the shaded region 434.

The embodiment shown in FIG. 2 also includes counter 210. Control unit 220 may be configured to assign time periods to domains for a physical link based on values of counter 210. Counter 210 may be configured to increment or decrement in response to a clock signal received on clock input 212. The clock signal may be generated by system clock (not shown) or may be generated in CRL 200.

Figure 5A:
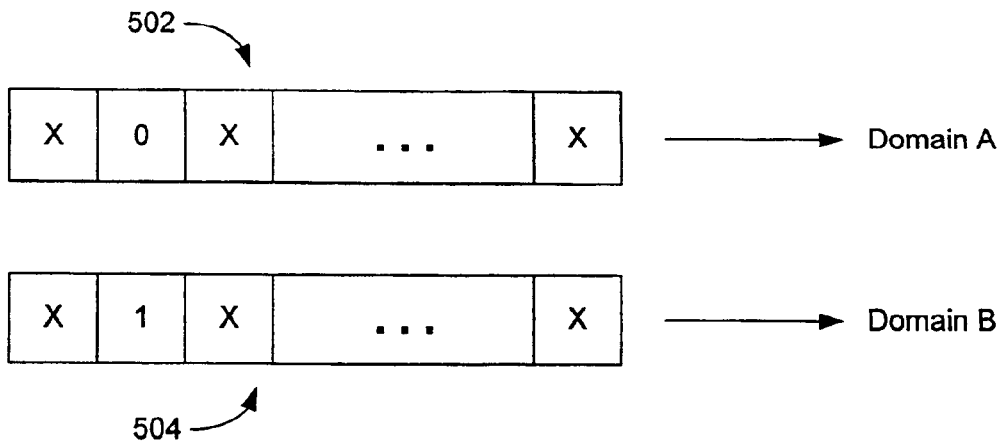
FIG. 5a is a diagram illustrating one embodiment of counter values that can be used for time multiplexing of multi-domain transactions.
Figure 5B:
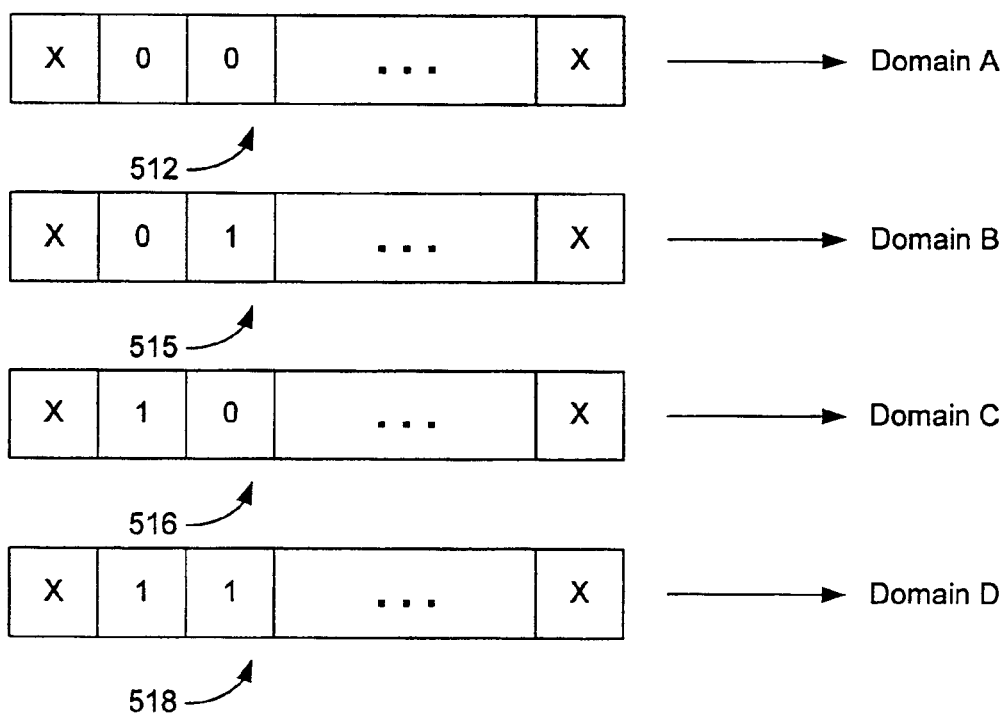
FIG. 5b is a diagram illustrating one embodiment of counter values that can be used for time multiplexing of multi-domain transactions.

Control unit 220 may assign time periods according to a particular value or values of counter 210. For example, control unit 220 may assign a first time period to a first domain where the first time period corresponds to a first plurality of values of counter 210 and a second time period to a second domain where the second time period corresponds to a second plurality of values of counter 210. Control unit 220 may be configured to detect a particular value of counter 210 to detect the start or end of a certain time period. As shown in FIG. 5a and FIG. 5b, control unit 220 may need to detect only a certain bit or bits to detect the start or end of a certain time period.

FIG. 5a illustrates a first example of counter values that can be used for time multiplexing of multi-domain transactions. Counter values 502 and 504 each illustrate the values each bit of counter 210 at different times. As illustrated by FIG. 5a, control 220 may be configured to assign time slices based on a single bit of counter 210. Counter value 502 includes a bit with a value of zero and counter value 504 includes the same bit with a value of one. Control unit 220 may be configured to assign the time period where the bit is zero to domain A and the time period where the bit is one to domain B as illustrated. It can be noted that the X's in the other bit positions of the counter indicate "don't care" values that can be either zero or one during these respective time periods. The portion of counter values 502 and 504 that includes ". . . " indicates that any number of other bits may be included in counter values 502 and 504.

FIG. 5b illustrates a second example of counter values that can be used for time multiplexing of multi-domain transactions. Counter values 512, 514, 516 and 518 each illustrate the values each bit of counter 210 at different times. As illustrated by FIG. 5b, control 220 may be configured to assign time slices based on multiple bits of counter 210. Counter value 512 includes two bits with values of zero. Counter value 514 includes the same bits with values of zero and one, respectively, counter value 516 includes the same bits with values of one and zero, respectively, and counter value 518 includes the same bits with values of one. Control unit 220 may be configured to assign the time period where the bits are zero to domain A, the time period where the bits are zero and one, respectively, to domain B, the time period where the bits are one and zero, respectively, to domain C, and the time period where the bits one to domain D as illustrated. It can be noted that the X's in the other bit positions of the counter indicate "don't care" values that can be either zero or one during these respective time periods. The portion of counter values 512, 514, 516 and 518 that includes ". . . " indicates that any number of other bits may be included in counter values 512, 514, 516 and 518.

FIGS. 5a and 5b are shown by way of example. It can be noted that control unit 220 may be configured to assign time periods that correspond to counter values in numerous other manners. Further, counter 210 may include any suitable number of bits according to a particular embodiment.

Although the embodiments above have been described in considerable detail, other versions are possible. Numerous variations and modifications will become apparent to those skilled in the art once the above disclosure is fully appreciated. It is intended that the following claims be interpreted to embrace all such variations and modifications.

We claim:

1. A system comprising:
   a first domain including a first plurality of clients;
   a second domain including a second plurality of clients;
   a first central repeating level coupled to said first domain and said second domain, wherein said first central repeating level includes a first counter, and a first control unit.

wherein said first central repeating level is configured to receive and convey transactions corresponding to said first plurality of clients during a first time period that corresponds to a first plurality of counter values of said first counter, and wherein said first central repeating level is configured to receive and convey transactions corresponding to said second plurality of clients during a second time period that, corresponds to a second plurality of counter values of said first counter; and a second central repeating level coupled to said first central repeating level, wherein said second central repeating level includes a second counter;

wherein said second central repeating level is configured to receive and convey transactions corresponding to said first plurality of clients during a third time period that corresponds to a first plurality of counter values of said second counter, and wherein said second central repeating level is configured to receive and convey transactions corresponding to said second plurality of clients during a fourth time period that corresponds to a second plurality of counter values of said second counter;

wherein the first control unit is configured to cause the first time period associated with the first central repeating level for receiving and conveying a first transaction corresponding to the first plurality of clients to overlap with the third time period associated with the second central repeating level for receiving and conveying the first transaction.

2. The system of claim 1, wherein said first counter is configured to increment in response to a clock signal.

3. The system of claim 1, further comprising:
a third domain coupled to said first central repeating level and said second central repeating level, wherein said third domain includes a third plurality of clients;
wherein said second central repeating level is configured to receive and convey transactions corresponding to said third plurality of clients during a fifth time period that corresponds to a third plurality of counter values of said second counter.

4. The system of claim 1, wherein said first central repeating level is configured to receive a programmable input, wherein said first central repeating level is configured to select said first plurality of counter values and said second plurality of counter values according to said programmable input.

5. The system of claim 1, wherein said first central repeating level is configured not to receive and convey transactions corresponding to said first plurality of clients during said second time period that, and wherein said first central repeating level is configured not to receive and convey transactions corresponding to said second plurality of clients during said first time period.

6. The system of claim 1, wherein a first number of said first plurality of counter values differs from a second number of said second plurality of counter values.

7. A system comprising:
a first domain including a first plurality of clients;
a second domain including a second plurality of clients;
a first central repeating level coupled to said first domain and said second domain, wherein said first central repeating level comprises:
a first receive queue;
a first transmit queue;
a first counter, wherein said first counter is configured to increment in response to a clock signal;
a first control unit coupled to said first receive queue, said first transmit queue, and said first counter;
wherein said first control unit is configured to permit transactions that correspond to the first plurality of clients to be received into said first receive queue and conveyed from said first transmit queue in response to a first set of values of said first counter, and wherein said first control unit is configured to permit transactions that correspond to the second plurality of clients to be received into said first receive queue and conveyed from said fist transmit queue in response to a second set of values of said first counter; and
a second central repeating level coupled to said first central repeating level, wherein said second central repeating level comprises:
a second receive queue;
a second transmit queue;
a second counter, wherein said second counter is configured to increment in response to a clock signal;
a second control unit coupled to said second receive queue, said second transmit queue, and said second counter;
wherein said second control unit is configured to permit transactions that correspond to the first plurality of clients to be received into said second receive queue and conveyed from said second transmit queue in response to a first set of values of said second counter, and wherein said second control unit is configured to permit transactions that correspond to the second plurality of clients to be received into said second receive queue and conveyed from said second transmit queue in response to a second set of values of said second counter;
wherein the first control unit is further configured to cause one of the first set of values of said first counter associated with the first central repeating level for receiving and conveying a first transaction corresponding to the first plurality of clients to overlap in time with one of the first set of values of said second counter associated with the second central repeating level for receiving and conveying the first transaction.

8. The system of claim 7, wherein said first control unit is configured to inhibit transactions that correspond to said first plurality of clients from being received into said first receive queue and conveyed from said first transmit queue in response to said second set of values of said first counter, and wherein said first control unit is configured to inhibit transactions that correspond to said second plurality of clients from being received into said first receive queue and conveyed from said first transmit queue in response to said first set of values of said first counter.

9. The system of claim 7, wherein said first control unit is configured to receive a programmable input, wherein said first control unit is configured to select said first set of values of said first counter and said second set of values of said first counter according to said programmable input.

10. A system comprising:
a plurality of domains that each include a plurality of clients;
a first central repeating level coupled to said plurality of domains, wherein said first central repeating level includes a first counter and a first control unit;
wherein said first central repeating level is configured to assign a first time period to each of said plurality of domains, wherein each first time period corresponds to a different plurality of counter values of said first counter, and wherein said first central repeating level is configured to receive and convey transactions for each of said plurality of domains during said first time period assigned to said each of said plurality of domains; and a second central repeating level coupled to said first central repeating level, wherein said second central repeating level includes a second counter;

wherein said second central repeating level is configured to assign a second time period to each of said plurality of domains, wherein each second time period corresponds to a different plurality of counter values of said second counter, and wherein said second central repeating level is configured to receive and convey transactions for each of said plurality of domains during said second time period assigned to said each of said plurality of domains;

wherein the first control unit is configured to cause the first time period associated with the first central repeating level for receiving and conveying a first transaction corresponding to a first domain to overlap with the second time period associated with the second central repeating level for receiving and conveying the first transaction.

11. The system of claim 10, wherein said first counter is configured to increment in response to a clock signal.

12. The system of claim 10, wherein said first central repeating level is coupled to said second central repeating level via a physical link, wherein the bandwidth associated with said physical link is divided between domains that convey transactions across said physical link.

13. The system of claim 10, wherein said first central repeating level is configured to receive a programmable input, wherein said central repeating level is configured to select said first plurality of counter values and said second plurality of counter values according to said programmable input.

14. The system of claim 10, wherein each of said first time periods corresponds to a same amount of time.

15. The system of claim 10, wherein said first time period assigned to a first one of said plurality of domains corresponds to a different amount of time than said first time period assigned to a second one of said plurality of domains.

16. A system comprising:

a first domain including a first plurality of clients;

a second domain including a second plurality of clients;

a first central repeating level coupled to said first domain and said second domain, wherein said first central repeating level includes a first control unit;

wherein said first central repeating level is configured to receive and convey transactions that correspond to said first plurality of clients during a first portion of each of a first plurality of time slices, and wherein said first central repeating level is configured to receive and convey transactions that correspond to said second plurality of clients during a second portion of said each of said first plurality of time slices; and a second central repeating level coupled to said first central repeating level;

wherein said second central repeating level is configured to receive and convey transactions that correspond to said first plurality of clients during a first portion of each of a second plurality of time slices, and wherein said first central repeating level is configured to receive and convey transactions that correspond to said second plurality of clients during a second portion of said each of said second plurality of time slices;

wherein the first control unit is configured to cause the first portion of one of said first plurality of time slices associated with the first central repeating level for receiving and conveying a first transaction corresponding to the first plurality of clients to overlap with the first portion of one of said second plurality of time slices associated with the second central repeating level for receiving and conveying the first transaction.

17. The system of claim 16, wherein the first control unit is configured to cause the second portion of one of said first plurality of time slices associated with the first central repeating level for receiving and conveying a second transaction corresponding to the second plurality of clients to overlap with the second portion of one of said second plurality of time slices associated with the second central repeating level for receiving and conveying the second transaction.

18. The system of claim 16, further comprising:

a third domain coupled to said first central repeating level and said second central repeating level, wherein said third domain includes a third plurality of clients;

wherein said second central repeating level is configured to receive and convey transactions that correspond to said third plurality of clients during a third portion of each of a second plurality of time slices.

19. The system of claim 16, wherein said first central repeating level includes a counter, and wherein said first portion of said each of said first plurality of time slices corresponds to a first plurality of values of said counter, and wherein said second portion of said each of said first plurality of time slices corresponds to a second plurality of values of said counter.

20. The system of claim 16, wherein said first central repeating level is configured to select a first size of said first portion of said each of said first plurality of time slices and a second size of said first portion of said each of said first plurality of time slices according to a programmable input.

21. The system of claim 20, wherein said first size differs from said second size.

22. The system of claim 16, wherein said first central repeating level is configured to select a first size of said first portion of said each of said first plurality of time slices according to a first volume of traffic from said first plurality of clients.

23. The system of claim 22, wherein said first central repeating level is configured to select a second size of said first portion of said each of said first plurality of time slices according to a second volume of traffic from said second plurality of clients.

* * * * *